US008759419B2

(12) United States Patent
Okuda et al.

(10) Patent No.: US 8,759,419 B2
(45) Date of Patent: Jun. 24, 2014

(54) WATER-BASED INK FOR INK-JET RECORDING AND CARTRIDGE

(75) Inventors: Satoshi Okuda, Inazawa (JP); Junichiro Sugimoto, Nagoya (JP); Tatsunosuke Hoshi, Nagoya (JP); Atsushi Nakamura, Nagoya (JP); Mitsunori Maeda, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 13/599,581

(22) Filed: Aug. 30, 2012

(65) Prior Publication Data

US 2013/0053495 A1    Feb. 28, 2013

(30) Foreign Application Priority Data

Aug. 30, 2011  (JP) .................. 2011-188027
Aug. 30, 2011  (JP) .................. 2011-188028
Aug. 30, 2011  (JP) .................. 2011-188029
Aug. 30, 2011  (JP) .................. 2011-188030

(51) Int. Cl.
C09D 11/00       (2014.01)
C08K 3/00         (2006.01)
C08F 8/30         (2006.01)

(52) U.S. Cl.
USPC ...................... 523/160; 524/424; 524/555

(58) Field of Classification Search
USPC .................. 523/160; 524/424, 555
See application file for complete search history.

(56) References Cited

U.S. PATENT DOCUMENTS

| | | | |
|---|---|---|---|
| 5,507,865 A * | 4/1996 | Yoshida et al. ............ 106/31.43 |
| 5,554,739 A | 9/1996 | Belmont | |
| 5,571,311 A | 11/1996 | Belmont et al. | |
| 5,630,868 A | 5/1997 | Belmont et al. | |
| 5,667,572 A * | 9/1997 | Taniguchi et al. ......... 106/31.36 |
| 5,672,198 A | 9/1997 | Belmont | |
| 5,713,988 A | 2/1998 | Belmont et al. | |
| 5,851,280 A | 12/1998 | Belmont et al. | |
| 5,861,447 A * | 1/1999 | Nagasawa et al. ............ 523/161 |
| 5,885,338 A * | 3/1999 | Nigam et al. ............... 106/31.33 |
| 5,900,029 A | 5/1999 | Belmont et al. | |
| 6,001,899 A * | 12/1999 | Gundlach et al. ............. 523/160 |
| 6,042,643 A | 3/2000 | Belmont et al. | |
| 6,211,265 B1 * | 4/2001 | Ohta et al. ..................... 523/160 |
| 6,383,274 B1 | 5/2002 | Lin | |
| 6,494,946 B1 | 12/2002 | Belmont et al. | |
| 7,438,405 B2 | 10/2008 | Ichizawa et al. | |
| 7,819,962 B2 | 10/2010 | Gu | |
| 8,016,404 B2 | 9/2011 | Kato et al. | |
| 2002/0016385 A1* | 2/2002 | Nakano et al. ................. 523/160 |
| 2003/0095914 A1 | 5/2003 | Belmont et al. | |
| 2004/0119801 A1 | 6/2004 | Suzuki et al. | |
| 2004/0257420 A1 | 12/2004 | Ichizawa et al. | |
| 2004/0261658 A1* | 12/2004 | Rehman ..................... 106/31.43 |
| 2005/0034629 A1 | 2/2005 | Belmont et al. | |
| 2007/0100023 A1 | 5/2007 | Burns et al. | |
| 2007/0100024 A1 | 5/2007 | Gu et al. | |
| 2008/0036830 A1* | 2/2008 | Natori et al. ..................... 347/86 |
| 2008/0241398 A1 | 10/2008 | Kato et al. | |
| 2009/0229489 A1 | 9/2009 | Gu | |
| 2011/0011307 A1 | 1/2011 | Shakhnovich et al. | |
| 2011/0187770 A1* | 8/2011 | Aoyama et al. .................... 347/6 |
| 2011/0187799 A1* | 8/2011 | Aoyama et al. ................... 347/84 |

FOREIGN PATENT DOCUMENTS

| | | |
|---|---|---|
| JP | 2001-207095 A | 7/2001 |
| JP | 2004-197046 A | 7/2004 |
| JP | 2005-008690 | 1/2005 |
| JP | 2006-199968 A | 8/2006 |
| JP | 2008-246821 A | 10/2008 |
| JP | 2009-513802 A | 4/2009 |
| JP | 2009-515007 A | 4/2009 |
| JP | 2011-510155 A | 3/2011 |
| JP | 2011-515535 A | 5/2011 |

* cited by examiner

*Primary Examiner* — Alexander Kollias
(74) *Attorney, Agent, or Firm* — Banner & Witcoff, Ltd.

(57) ABSTRACT

A water-based ink for ink-jet recording includes a self-dispersible pigment modified by phosphate group; water; a water-soluble organic solvent; at least one of a cationic polymer and basic amino acid; and at least one selected from the group consisting of boric acids, a chelate agent, a reducing sugar and a sugar alcohol.

7 Claims, 2 Drawing Sheets

WATER-BASED INK FOR INK-JET RECORDING AND CARTRIDGE

CROSS REFERENCE TO RELATED APPLICATION

The present application claims priorities from No. 2011-188027 filed on Aug. 30, 2011, Japanese Patent Application No. 2011-188028 filed on Aug. 30, 2011, Japanese Patent Application No. 2011-188029 filed on Aug. 30, 2011 and Japanese Patent Application No. 2011-188030 filed on Aug. 30, 2011, the disclosures of which are incorporated herein by reference in its entirety.

BACKGROUND OF THE INVENTION

1. Field of the Invention

The present invention relates to a water-based ink for ink-jet recording, and ink cartridge.

2. Description of the Related Art

In a water-based ink for ink-jet recording, a self-dispersible pigment is used in some cases. The self-dispersible pigment can be obtained by performing a treatment such that at least one hydrophilic group such as phosphate group, carboxylic group, or sulfonate group (sulfonic acid group), or a salt thereof is bonded to the pigment. Since the self-dispersible pigment does not require any polymeric pigment dispersant, the self-dispersible pigment is capable of preventing the viscosity of the water-based ink from increasing. Further, a self-dispersible pigment, among the hydrophilic groups each bonded to the pigment, which is treated in particular with the phosphate group can obtain high optical density (OD value) as compared with a self-dispersible pigment which is treated with the carboxylic group or the sulfonate group.

On the other hand, the water-based ink using the self-dispersible pigment treated with the phosphate group has a problem such that the ink composition thereof generally does not have satisfactory re-dispersion property. In a case that the water-based ink which does not have the satisfactory re-dispersion property is once evaporated to dryness with resultant solid matter in the vicinity of an ink channel and/or nozzles of an ink-jet head, the following situation may possibly arise. That is, in a case that the water-based ink is tried to be jetted again and that the solid matter is newly brought in contact with the water-based ink, the solid matter is not dissolved and dispersed. Thus, it is feared that any trouble occurs in jetting stability.

In view of the above situation, an object of the present teaching is to provide a water-based ink for ink-jet recording which includes a self-dispersible pigment, which has excellent re-dispersion property, and which can obtain relatively-high optical density (OD value).

SUMMARY OF THE INVENTION

According to the first aspect of the present teaching, there is provided a water-based ink for ink-jet recording including: a self-dispersible pigment modified by phosphate group; water; a water-soluble organic solvent; at least one of a cationic polymer and basic amino acid; and at least one selected from the group consisting of boric acids, a chelate agent, a reducing sugar and a sugar alcohol.

According to the second aspect of the present teaching, there is provided an ink cartridge containing the water-based ink for ink-jet recording as defined in the first aspect.

DESCRIPTION OF THE PREFERRED EMBODIMENTS

Figure 1:
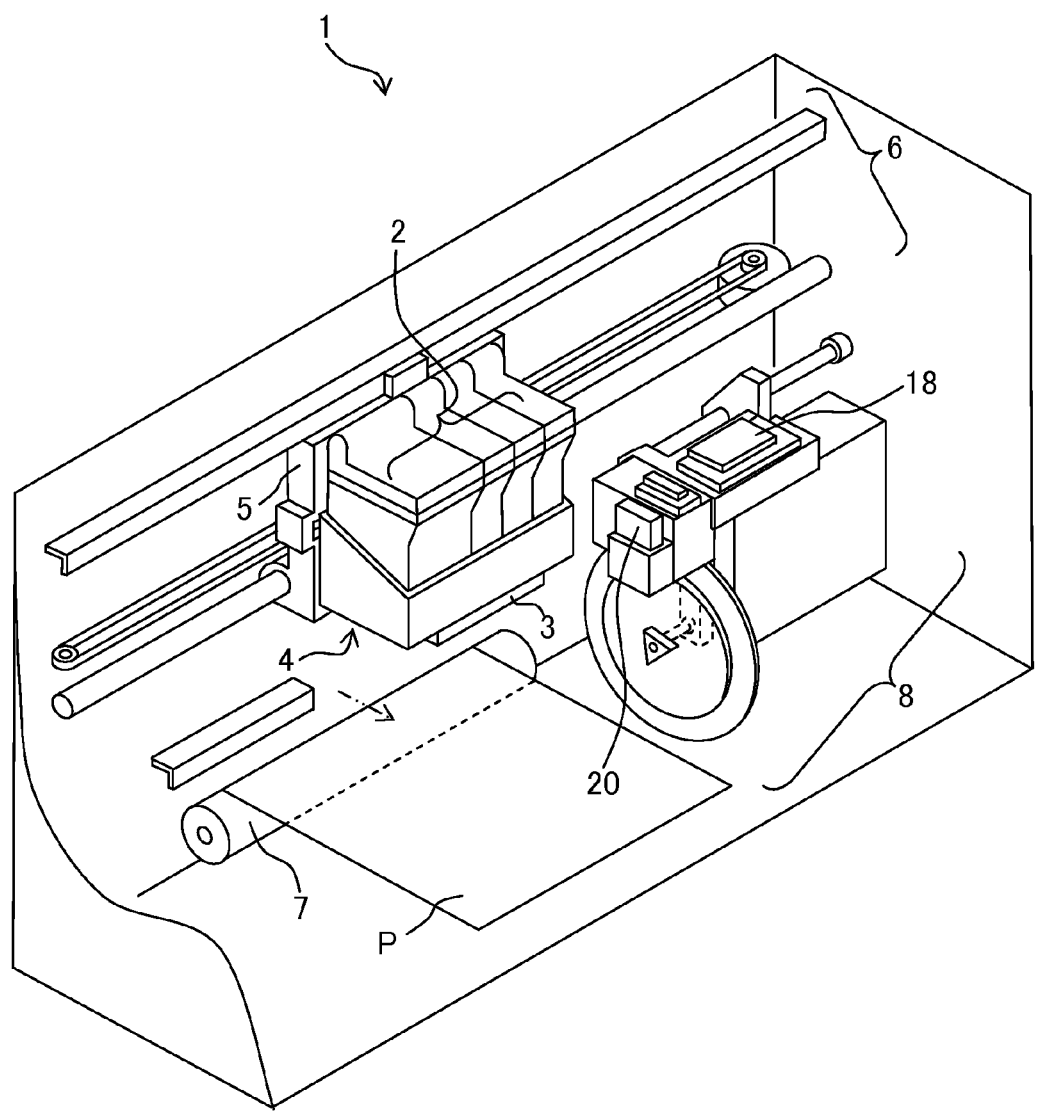
FIG. 1 is a schematic perspective view showing an example of a construction of an ink-jet recording apparatus according to the present teaching.

In order to achieve the object as described above, the inventors found out, through a series of diligent research and study, excellent re-dispersion property and high optical density (OD value) can be obtained in a case that a self-dispersible pigment modified by phosphate group is used as a coloring agent and further that at least one of a cationic polymer and basic amino acid and at least one selected from the group consisting of boric acids, a chelate agent, a reducing sugar, and a sugar alcohol are contained in a water-based ink for ink-jet recording. Then, the inventors arrived at the present teaching.

In the present teaching, the term "re-dispersion property" means, for example, solubility and dispersion property of a solid matter, in a water-based ink, generated after the water-based ink is once evaporated to dryness with resultant solid matter, the solubility and dispersion property being those of when the solid matter is then newly brought in contact with the water-based ink.

An explanation will be made about a water-based ink for ink-jet recording of the present teaching (hereinafter sometimes referred to as "water-based ink" or "ink"). The water-based ink of the present teaching contains a colorant, water, and a water-soluble organic solvent. As described above, the colorant includes a self-dispersible pigment modified by phosphate group (hereinafter sometimes referred to as "phosphate group-modified self-dispersible pigment). By containing the phosphate group-modified self-dispersible pigment as the colorant, it is possible to obtain the water-based ink having high optical density (OD value). Further, as will be described later on, by containing at least one of the cationic polymer and the basic amino acid in the water-based ink, it is possible to obtain the water-based ink having even higher optical density (OD value). The phosphate group-modified self-dispersible pigment can be prepared by methods described in, for example, Published Japanese Translation of PCT International Publication for Patent Application Nos. 2009-515007 (PCT International Publication WO2007/053564), 2011-515535, 2009-513802, 2011-510155 and Japanese Patent Application laid-open No. 2006-199968. It is allowable to use, for example, a commercially available product as the phosphate group-modified self-dispersible pigment. Since the water-based ink of the present teaching uses the self-dispersible pigment, the water-based ink of the present teaching has no problem of viscosity increase due to a polymeric pigment dispersant and has excellent handling property.

The pigment, which is usable as the raw material for the self-dispersible pigment, includes, for example, carbon black, an inorganic pigment, and an organic pigment. The carbon black includes, for example, furnace black, lamp black, acetylene black, channel black, etc. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Further, other than the above, the pigments also include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like. In particular, a pigment which is suitable to be modified with the phosphate group includes, for example, the carbon black such as "MA8" and "MA100" produced by Mitsubishi Chemical Corporation and "Color Black FW200" produced by Degussa.

The phosphate group-modified self-dispersible pigment can be prepared by a publicly known method. The method for preparing the phosphate group-modified self-dispersible pigment is, for example, as follows. Hereinbelow, an explanation will be made about a method for preparation of a carbon black modified by a group having the formula —CO—NH—CH(PO$_3$H$_2$)$_2$ or salts thereof (preparation method 1) and a method for preparation of a carbon black modified by a group having the formula —SO$_2$—NH—CH(PO$_3$H$_2$)$_2$ or salts thereof (preparation method 2).

[Preparation Method 1]

Aminomethylenebisphosphonate (AMBP) is prepared as shown in Scheme 1 below using one of the following methods.

Scheme 1

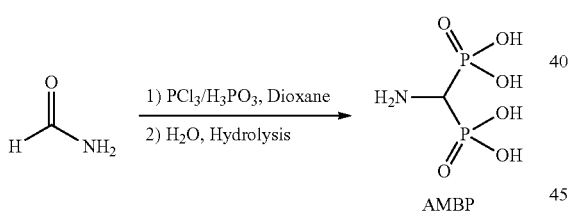

AMBP

<Method A>

Phosphorus acid (750 g, 9.15 moles, 1.6 equiv) is charged into a reactor provided with a mechanical stirrer, a condenser with a guard tube, a water condenser, a thermometer, and an addition funnel under a nitrogen atmosphere. To this is added 1,4-dioxane (1.5 L) followed by formamide (250 g, 5.56 moles, 1 equiv) with stirring. The nitrogen atmosphere is removed, and the mixture is warmed to 60° C. for 1 hour and then cooled backed to 20° C. Phosphorus trichloride (1.5 L, 17.19 moles, 3.1 equiv) is added to the mixture over a period of 3 hours, and the resulting mixture is then heated to 60° C. for 3 hours. During the heating, the reaction mixture turns into a white sticky mass, which is difficult to stir towards the end. Heating and stirring is discontinued, and the reaction mixture is allowed to stand at room temperature overnight. After removing the liquid phase by decanting, water (2.5 L) is added to the reaction mass for the hydrolysis, and this is then heated to reflux for 4 hours. The reaction mixture is cooled to room temperature, filtered, washed with methanol (2.5 L), and dried under vacuum, yielding AMBP as a white solid (540 g, 51% yield). $^1$HNMR data for this compound (D$_2$O/NaOH) is as follows: 2.56 (t, 1H, J=16.4 Hz). LC-MS data for this compound is as follows: 190 [M-1].

<Method B>

To a stirred mixture of formamide (500 g, 11.11 mol) and phosphorus acid (800 g, 9.75 mol) in a 20 L multi-neck round bottom flask provided with an overhead mechanical stirrer, a water condenser with a guard tube, a thermometer, and a liquid addition funnel is added deionized water (600 mL, 33.33 mol). The mixture is cooled to 10° C. in an ice water bath, and to this is added 0.5 L of phosphorus trichloride (note: the addition of phosphorus trichloride to water is exothermic) over a period of 3 hours followed by another addition of 0.5 L of phosphorus trichloride over a period of 30 minutes at a temperature of below 20-25° C. When all of the water is consumed, the temperature drops to below 10° C., and to this is added 2.5 L of phosphorus trichloride over a period of 15 minutes (total phosphorus trichloride addition is 3.5 L, 40 mol). To control the frothing, the stirrer is lifted up in the flask and stirred at a higher rate. Then the reaction mixture is warmed to 60° C. in 2 to 2.5 hours and continued at that temperature until the reaction mass solidifies and can not stir further (approximately 1 hour after reaching 60° C.). Heating and stirring is discontinued, and the reaction mixture is left as is overnight for slow cooling to 40° C. Any remaining excess phosphorus trichloride is decanted off, and 1 L demineralized water is added to the reaction mixture over a period of 4 hours under a nitrogen atmosphere (heat evolution of this quenching process is controlled by portion-wise addition of water to avoid the presence of excess water, which may react violently). The reaction mixture is stirred for approximately 0.5 hour, and then another 4 L demineralized water is added and heated to reflux for 6 hours. The resulting mixture is allowed to cool to 35° C. overnight and is then filtered, washed with 2 L deionized water followed by 2 L acetone, and dried at reduced pressure overnight, yielding AMBP as a white solid (830 g, 39% yield). $^1$HNMR data for this compound (400 MHz, D$_2$O—NaOH) is as follows: 2.56 (t, 1H, J=16.4 Hz). LC-MS data for this compound is as follows: 190 [M-I].

AMBP is reacted with 4-nitrobenzoylchloride as shown in Scheme 2 below.

Scheme 2

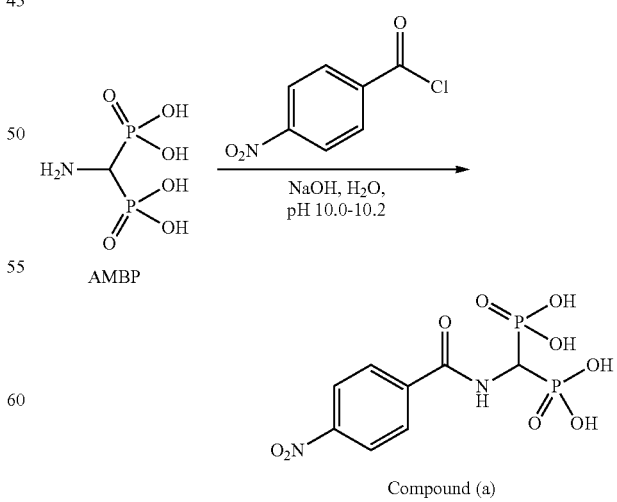

Compound (a)

A mixture of p-nitrobenzoic acid (500 g, 3.0 moles, 1 equiv) and thionyl chloride (600 mL, 8.2 moles, 2.73 equiv) is heated to reflux for approximately 6-7 hours until a clear solution is obtained. Excess of thionyl chloride is removed by distillation followed by co-distillation with toluene (300 mL). The reaction mass is cooled to room temperature, and hexane (1.5 L) is added, forming a precipitate, which is then filtered and dried under vacuum, yielding 4-nitrobenzoyl chloride as a yellow solid (530 g, approximately 100% yield), which is used without any further purification.

AMBP (450 g, 2.35 moles, 1 equiv) is suspended in deionized water (9 L). To this is added a 10N aqueous sodium hydroxide solution to adjust the pH to 10.0. To this is then added all of the previously prepared 4-nitrobenzoyl chloride over a period of 1 hour, while maintaining the reaction pH at 10.1-10.2 by addition of the 10N aqueous sodium hydroxide solution as needed. After the addition is completed, the reaction mixture is warmed to 60-65° C. in a preheated oil bath. The pH is maintained at 10.0 by continued addition of the 10N aqueous NaOH solution until no further drop in pH is observed. After 1.5 hours of heating, the reaction mixture is cooled to room temperature and filtered. The pH of the filtrate is adjusted to 3.9 by addition of a 5N aqueous HCl solution, and the resulting precipitate, containing mostly p-nitrobenzoic acid, is removed by filtration. The filtrate (which contains Compound (a) with approximately 9% p-nitrobenzoic acid) is used without further purification.

The filtrate containing Compound (a) is reacted as shown in Scheme 3 below.

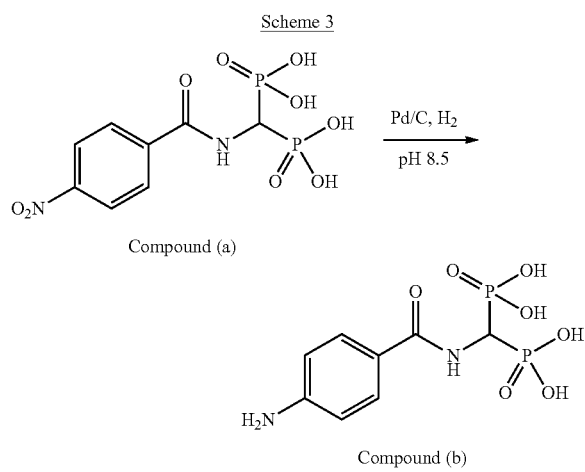

Scheme 3

Compound (a)

Compound (b)

The pH of the filtrate is adjusted to 8.5 by addition of a 10N aqueous NaOH solution. To this is added 5% Pd/C (50% wet, 16 g, 1 wt % assuming 800 g of Compound (a) in the filtrate). The mixture is hydrogenated in a Parr shaker at 6 kg/cm$^2$ hydrogen pressure at room temperature until no further pressure decrease is observed. The pressure is released, and the reaction mixture is filtered through a celite bed. The pH of the filtrate is adjusted to 1.5 by addition of a 5N aqueous HCl solution. The resulting precipitate is isolated by filtration and washed successively with 1:1 methanol-water, methanol, and finally with acetone. The resulting product is dried at reduced pressure overnight, yielding Compound (b) as a white solid (600 g, 82% yield). $^1$HNMR (400 MHz) data for this compound ($D_2O$) is as follows: 7.73 (d, 2H, J=8.4 Hz), 6.88 (d, 2H, J=8.4 Hz), 4.29 (t, 1H, J=18.8 Hz). $^{13}$CNMR (100 MHz) data for this compound ($D_2O$) is as follows: 171.1, 153.2, 131.9, 127.2, 118.3 and 53.9 (t). LC-MS data for this compound is as follows: 309 [M-I].

The phosphate group-modified self-dispersible pigment is prepared using one of the following general procedures. The methods, pigment types as specific raw materials, and specific amounts of Compound (b) (treatment level, mmol of Compound (b) per gram of carbon black) are shown in TABLE 1 below.

TABLE 1

| No. | Method | Pigment | Treatment Level (mmols/g) |
|-----|--------|---------|---------------------------|
| 1A | A | BP1000 | 0.75 |
| 1B | A | BP700 | 0.75 |
| 1C | B | BP880 | 0.25 |
| 1D | B | BP880 | 0.35 |
| 1E | B | BP880 | 0.50 |

In TABLE 1, BP1000 is Black Pearls (trade name) 1000 carbon black (a carbon black having a BET surface area of 343 m$^2$/g and a DBPA of 105 mL/100 g), BP700 is Black Pearls (trade name) 700 carbon black (a carbon black having a BET surface area of 200 m$^2$/g and a DBPA of 117 mL/100 g), and BP880 is Black Pearls (trade name) 880 carbon black (a carbon black having a BET surface area of 220 m$^2$/g and a DBPA of 105 mL/100 g), each available from Cabot Corporation.

<Method A>
20 g of a carbon black, 20 mmol of Compound (b) and 200 mL of DI water are mixed with a Silverson mixer (6000 rpm) at room temperature. If the pH of the resulting slurry is greater than 4, 20 mmol of nitric acid is also added. After 30 min, sodium nitrite (20 mmol) in a small amount of water is added slowly into the mixture. The temperature reaches 60° C. through mixing, and this is allowed to proceed for 1 hour. The phosphate group-modified self-dispersible pigment is produced. The pH is adjusted to 10 with a NaOH solution. After 30 min, the resulting dispersion of the phosphate group-modified self-dispersible pigment, comprising a pigment having attached at least one geminal bisphosphonic acid group or salts thereof, is diafiltered with a Spectrum membrane using 20 volumes of DI water and concentrated to approximately 12% solids and sonicated for 30 min to achieve a desired particle size.

<Method B>
A ProcessAll 4HV Mixer (4 liter) is charged with 500 g of dry carbon black, 1 L of DI water, and Compound (b). The resultant mixture is then heated to 60° C. while intensely mixing at 300 RPM for 10 minutes. To this is added a 20% aqueous sodium nitrite solution (1 molar equivalent based on the amount of Compound (b)) over 15 minutes. Heating and mixing is continued for a total of 3 hours. The contents of the mixer are removed by diluting with an additional 750 mL of DI water, and the resulting dispersion of the phosphate group-modified self-dispersible pigment is then purified by diafiltration using DI water. At the end of the diafiltration (permeate conductivity<200 micro Siemens) the concentration of the phosphate group-modified self-dispersible pigment in the dispersion is adjusted to 15% and then centrifuged in a Carr Continuous Centrifuge (PilotFuge).

For each dispersion, the sodium content is measured with an Orion Ion Selective Electrode, and the results, expressed on a solid basis, are shown in TABLE 2 below. Also, the total amount of phosphorous is measured by elemental analysis, and the results, expressed as a weight percent, are also shown in TABLE 2 below. Also shown are the mean volume particle sizes (nm) of the modified pigment in the dispersions, measured using a Microtrac (trade mark) Particle Size Analyzer.

TABLE 2

| No. | Particle Size (nm) | Na (ppm) | % P |
| --- | --- | --- | --- |
| 1A | 120 | 27868 | 2.31 |
| 1B | 145 | 20658 | 2.25 |
| 1C | 106 | 11608 | 1.34 |
| 1D | 102 | 14621 | 1.54 |
| 1E | 104 | 19940 | 2.20 |

[Preparation Method 2]

Compound (c) is prepared from AMBP using the procedure described in Preparation Method 1, with the exception that 4-nitrobenzenesulfonyl chloride is used in place of 4-nitrobenzoyl chloride. The reaction is shown in Scheme 4 below.

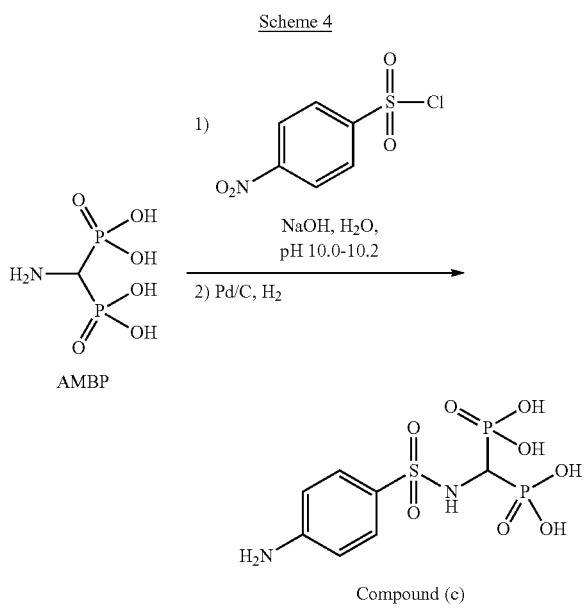

Scheme 4

Compound (c)

Thus, to a suspension of 375 g of AMBP (1.96 mmol) in 3 L deionized water is added a 10N NaOH solution (600 ml). The addition is done rapidly in order to dissolve the AMBP at ambient temperature (reaction temperature is observed to increase to 40° C.). Then, the pH of the reaction mixture is adjusted to 9.9 by using a 10N NaOH solution. 4-Nitrobenzenesulfonyl chloride is added to this portion-wise over a period of 1.5 hours, maintaining the pH at 9.75-9.9 by adding a 10N NaOH solution as needed. The reaction temperature is observed to increase to 48-50° C. at the end of the addition, and stirring is continued for another 30 minutes at this temperature until the pH is steady at 9.8. $^1$HNMR analysis of the mixture shows 52% conversion. The reaction mixture is filtered hot, cooled to 40° C., and the pH of the filtrate is adjusted to 1.3 by adding 500 ml of concentrated HCl. This is further cooled to 15-20° C. in an ice water bath and stirred for 1.5-2 hours and left overnight. The resulting precipitated solid is filtered, washed with 2 L of methanol followed by 2 L of acetone, and dried under reduced pressure to obtain the desired product having a $^1$HNMR purity of approximately 55%. To the residual mother liquor is added an equal volume (5.5 L) of methanol. This is stirred for 1 hour, and the resulting precipitated solid is filtered, washed with 1 L methanol followed by 1 L acetone, and dried under reduced pressure to obtain additional product, which has a $^1$HNMR purity of approximately 45%. The two batches of solids are combined, yielding the desired nitrobenzylsulfonamide as a white solid (approximately 700 g having a purity of approximately 50%), which is used as is for the hydrogenation step. $^1$HNMR data for this compound (400 MHz, $D_2O$—NaOH) is as follows: 8.38 (2H, d, 8 Hz), 8.12 (2H, d, 8 Hz), 3.79 (1H, t, 20 Hz) and 2.6 (1H, t, 17.6 Hz).

The sulfonamide product is suspended over deionized water (3 L) and stirred for 5 minutes. Any insoluble starting material is removed by filtration (70 g). To the filtrate is added 120 mL of a 10N NaOH solution in order to adjust the pH to 8.5. To this solution is added 5% Pd/C (50% by weight-wet), and the mixture is hydrogenated at 10 kg/sqcm $H_2$ pressure for 3 hours at room temperature. $^1$HNMR analysis of the reaction mixture shows the absence of starting material. The reaction mixture is filtered through celite, and the pH of the filtrate is readjusted to 0.95 by addition of 200 mL of 10N HCl. The resulting precipitate is filtered, washed with water (1 L) followed by acetone (1 L), and dried under reduced pressure at 60° C., yielding Compound (c) as a white solid (180 g, 88% yield). $^1$HNMR data for this compound (400 MHz, $D_2O$/NaOH) is as follows: 7.73 (2H, d, 8.8 Hz), 6.79 (2H, d, 8.8 Hz), 3.45 (1H, t, 18.4 Hz). $^{13}$CNMR data for this compound (400 MHz, $D_2O$/NaOH) is as follows: 152.5, 131.1, 130.7, 116.3 and 55.1 (t). LC-MS data for this compound is as follows: 345 [M-23].

A dispersion of the phosphate group-modified self-dispersible pigment is prepared using Method B, described in Preparation Method 1 above, using CB-C as the pigment and Compound (c) at a treatment level of 0.35 mmoles of Compound (c) per gram of carbon black. Particle size, sodium content, and total amount of phosphorous for this modified pigment are shown in TABLE 3 below.

TABLE 3

| Example No. | Partucle Size (nm) | Na (ppm) | % P |
| --- | --- | --- | --- |
| | 114 | 12792 | 1.08 |

The solid content blending amount (pigment solid content) of the phosphate group-modified self-dispersible pigment with respect to the entire amount of the water-based ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight.

The colorant may further contain any other pigment, dye, etc., in addition to the phosphate group-modified self-dispersible pigment; or it is allowable that the colorant does not contain any other pigment, dye, etc. That is, it is allowable that the phosphate group-modified self-dispersible pigment is singly used as the colorant. Further, it is allowable that a self-dispersible carbon black is singly used as the phosphate group-modified self-dispersible pigment.

The water used in the water-based ink is preferably ion-exchanged water or pure water (purified water). The blending amount of water (water ratio) with respect to the entire amount of the water-based ink is, for example, 10% by weight to 90% by weight, and is preferably 40% by weight to 80% by weight. The water ratio may be, for example, the balance of the ink, excluding the other components.

The water-soluble organic solvent used in the water-based ink includes, for example, a humectant which prevents the water-based ink from drying at an end of the nozzle in the ink-jet head and a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent (polyhydric) alcohols such as polyalkylene glycol, alkylene glycol, glycerol, and trimethylolpropane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. It is allowable that only one kind of the humectant as described above is used singly, or two or more kinds of the humectants are used in combination. Among the above-described humectants, it is preferable to use polyvalent alcohols such as alkylene glycol, glycerol, etc.

The blending amount of the humectant with respect to the entire amount of the water-based ink is, for example, 0% by weight to 95% by weight, is preferably 5% by weight to 80% by weight, and is more preferably 5% by weight to 50% by weight.

The penetrant includes, for example, glycol ether. The glycol ether includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one kind of the penetrant as described above is used singly, or two or more kinds of the penetrants are used in combination.

The blending amount of the penetrant with respect to the entire amount of the water-based ink is, for example, 0% by weight to 20% by weight, is preferably 0.1% by weight to 15% by weight, and is more preferably 0.5% by weight to 10% by weight.

As described above, the water-based ink further includes at least one of the cationic polymer and the basic amino acid and at least one selected from the group consisting of the boric acids, the chelate agent, the reducing sugar, and the sugar alcohol. It is assumed that it is possible to obtain the water-based ink having the excellent re-dispersion property by containing at least one selected from the group consisting of the boric acids, the chelate agent, the reducing sugar, and the sugar alcohol; and that it is possible to obtain the water-based ink having the higher optical density (OD value) than conventional water-based inks by containing at least one of the cationic polymer and the basic amino acid. The present teaching, however, is not limited to this assumption.

The boric acids include, for example, oxo acid of boron such as orthoboric acid, metaboric acid, tetraboric acid, and a salt thereof (including hydrate). The oxo acid may be generated by hydrating boric oxide. In particular, the boric acids include, for example, ammonium borate (ammonium tetraborate tetrahydrate, ammonium pentaborate octahydrate, etc.); potassium borate (potassium tetraborate tetrahydrate etc.); lithium borate (lithium tetraborate (anhydrous), lithium tetraborate trihydrate, etc.); boric acid; sodium borate (disodium tetraboric (anhydrous), disodium tetraboric decahydrate, borate soda (borax), etc.); and barium borate. The boric acids are preferably at least one of ammonium borate and potassium borate. However, the compounds described above are merely examples of the present teaching, and the number of boron atoms, the number of and kinds of positive ions in borate salt, the number of water molecules in the hydrate, etc., are not limited thereto. The blending amount of the boric acids with respect to the entire amount of the water-based ink is, for example, 0.01% by weight to 10% by weight, is preferably 0.05% by weight to 3% by weight, and is more preferably 0.1% by weight to 1% by weight. From a viewpoint of re-dispersion property, the blending amount of the boric acids with respect to the entire amount of the water-based ink is preferably 0.5% by weight to 1% by weight. It is allowable that only one kind of the boric acids as described above is used singly, or two or more kinds of the boric acids are used in combination.

The chelate agent is not particularly limited, and it is allowable to use publicly known products or substances. The chelate agent includes, for example, ethylenediamine tetraacetic acid, ethylenediamine diacetic acid, nitrilo triacetic acid, 1,3-propanediamine tetraacetic acid, diethylenetriamine pentaacetic acid, N-hydroxyethyl ethylenediamine triacetic acid, iminodiacetic acid, uramildiacetic acid, 1,2-diaminocyclohexane-N,N,N',N'-tetraacetic acid, malonic acid, succinic acid, glutaric acid, maleic acid, and salts thereof (including hydrates). The chelate agent is preferably at least one selected from the group consisting of ethylenediamine tetraacetic acid, a salt of ethylenediamine tetraacetic acid, nitrilo triacetic acid, and a salt of nitrilo triacetic acid. The blending amount of the chelate agent with respect to the entire amount of the water-based ink is, for example, 0.01% by weight to 10% by weight, is preferably 0.05% by weight to 5% by weight, and is more preferably 0.1% by weight to 3% by weight. From a viewpoint of re-dispersion property, the blending amount of the chelate agent with respect to the entire amount of the water-based ink is preferably 0.5% by weight to 1% by weight. It is allowable that only one kind of the chelate agent as described above is used singly, or two or more kinds of the chelate agents are used in combination.

The reducing sugar includes, for example, glucose, mannose, galactose, fructose, arabinose, ribose, xylose, erythrose, glyceraldehyde, lactose, maltose, dihydroxyacetone, erythrulose, xylulose, ribulose, psicose, sorbose, tagatose, sedoheptulose, coriose, threose, lyxose, allose, talose, gulose, altrose, and idose. The reducing sugar is preferably at least one of glucose and xylose. In a case that both of D and L forms are present in the reducing sugar, any one of them or a mixture of both forms may be used. Similarly, in a case that both of d form (dextro-rotatory, (+)) and l form (levo-rotatory, (−)) are present in the reducing sugar, any one of them or a mixture of both forms may be used. The blending amount of the reducing sugar with respect to the entire amount of the water-based ink is, for example, 0.01% by weight to 30% by weight, is preferably 0.05% by weight to 20% by weight, and is more preferably 0.2% by weight to 10% by weight. From a viewpoint of re-dispersion property, the blending amount of the reducing sugar with respect to the entire amount of the water-based ink is preferably 5% by weight to 10% by weight. It is allowable that only one kind of the reducing sugar as described above is used singly, or two or more kinds of the reducing sugars are used in combination.

The sugar alcohol includes, for example, sorbitol (another name: glucitol), mannitol, iditol, talitol, dulcitol, allodulcitol (another name: allitol), xylitol, ribitol (another name: adonitol), arabitol, meso-erythritol, threitol, isomalt, lactitol, maltitol, volemitol, and perseitol. Out of these, the sugar alcohol is preferably sorbitol, mannitol, or xylitol from the viewpoint of solubility and ease of obtaining. The sugar alcohol is more preferably at least one of sorbitol and mannitol. In a case that both of D and L forms are present in the sugar alcohol, any one of them or a mixture of both forms may be used. The blending amount of the sugar alcohol with respect to the entire amount of the water-based ink is, for example, 0.01% by weight to 20% by weight, is preferably 0.05% by weight to 12% by weight, and is more preferably 0.2% by weight to 8% by weight. From a viewpoint of re-dispersion property, the blending amount of the sugar alcohol with respect to the entire amount of the water-based ink is preferably 5% by weight to 8% by weight. It is allowable that only one kind of the sugar alcohol as described above is used singly, or two or more kinds of the sugar alcohols are used in combination.

The water-based ink may contain at least one of the boric acids and the chelate agent. Further, the water-based ink may contain at least one of the reducing sugar and the sugar alcohol. The reason why the re-dispersion property of the water-based ink is improved by the reducing sugar or the sugar alcohol is not clear, but it is assumed that water retention ability is superior due to the chemical structure in which many hydroxyl groups are contained, and thereby making it possible to retain water in the solid matter even in a state that the water-based ink is evaporated and solidified.

It is allowable that any one of the boric acids, the chelate agent, the reducing sugar, and the sugar alcohol is singly used in the water-based ink; or it is allowable that two or more are selected from the group consisting of the boric acids, the chelate agent, the reducing sugar, and the sugar alcohol and are used in combination.

The cationic polymer is preferably at least one of compounds represented by the following general formula (1), the following general formula (2), and the following general formula (3).

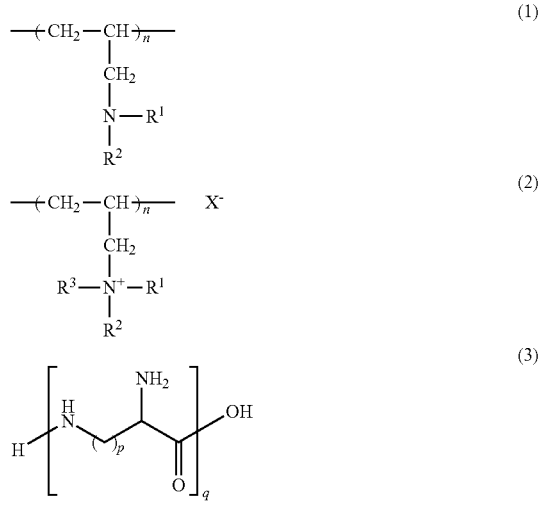

In the general formulae (1) and (2), $R^1$ to $R^3$ each are a hydrogen atom or organic group. The organic group is exemplified, for example, by alkyl group and aryl group. The alkyl group may have a straight chain or a branched chain, which is exemplified by methyl group, ethyl group, n-propyl group, isopropyl group, n-butyl group, isobutyl group, sec-butyl group, tert-butyl group, n-hexyl group, cyclohexyl group, n-octyl group, 2-ethylhexyl group, n-decyl group, n-dodecyl group, octadecyl group, 1,3-butadienyl group, 1,3-pentadienyl group, etc. The aryl group is exemplified, for example, by phenyl group, naphthyl group, tolyl group, and vinyl phenyl group. The alkyl group and aryl group each may have a substituent or substituents. The alkyl group and aryl group having the substituent or substituents are exemplified, for example, by fluoroethyl group, trifluoroethyl group, methoxyethyl group, phenoxyethyl group, hydroxyphenylmethyl group, chlorophenyl group, dichlorophenyl group, trichlorophenyl group, bromophenyl group, iodophenyl group, fluorophenyl group, hydroxyphenyl group, methoxyphenyl group, acetoxyphenyl group, and cyanophenyl group.

In the general formula (2), $X^-$ is an anion. The anion may be any; and is exemplified, for example, by a halide ion, a sulfonic acid ion, an alkyl sulfonic acid ion, an aryl sulfonic acid ion, an alkylcarbboxylic ion, and an arylcarbboxylic ion.

In the general formulae (1) and (2), "n" is a positive integer, for example, is 2 to 400, is preferably 5 to 300, and is more preferably 10 to 200. Weight-average molecular weight of the compound represented by each of the general formulae (1) and (2) is not particularly limited, for example, is 200 to 20000, is preferably 500 to 15000, and more preferably 1000 to 9000.

In the general formula (1), $R^1$ and $R^2$ each are especially preferably a hydrogen atom. In this case, the compound represented by the general formula (1) is polyallylamine. Further, in the general formula (2), $R^1$ to $R^3$ each are preferably a hydrogen atom, and $X^-$ is preferably a chloride ion. In this case, the compound represented by the general formula (2) is polyallylamine hydrochloride (allylamine hydrochloride polymer).

In the general formula (3), p is an integer of 2 to 6 and q is an integer of 20 to 40.

In the general formula (3), it is particularly preferably that p is 4. In such a case, the compound represented by the general formula (3) is polylysine. Further, in the general formula (3), it is preferable that q is 25 to 35.

The compound represented by the general formula (3) may include a derivative of the compound represented by the general formula (3). In a case that an isomer, such as a tautomer or steroisomer (for example, geometric isomer, conformational isomer, and steroisomer), exists in the compound represented by the general formula (3) and the derivative thereof, it is allowable to use any one of the isomers in the present teaching. Further, a salt of the compound represented by the general formula (3) and a salt of the derivative of the compound represented by the general formula (3) may also be used in the present teaching. The salt may be an acid addition salt or a base addition salt. Further, the acid composing the acid addition salt may be an inorganic acid or organic acid, and the base composing the base addition salt may be an inorganic base or organic base. Although the inorganic acid is not particularly limited, the inorganic acid is exemplified by hydrochloric acid, sulfuric acid, phosphoric acid, hydrofluoric acid, hydrobromic acid, hydroiodic acid, hypofluorous acid, hypochlorous acid, hypobromous acid, hypoiodous acid, fluorous acid, chlorous acid, bromous acid, iodous acid, fluoric acid, chloric acid, bromic acid, iodic acid, perfluorinated acid, perchloric acid, perbromic acid, periodic acid, etc. Although the organic acid is also not particularly limited, the organic acid is exemplified by glutamic acid, p-toluenesulfonic acid, methanesulfonic acid, oxalic acid, p-bromobenzenesulfonic acid, carbonic acid, succinic acid, citric acid, benzoic acid, acetic acid, hydroxy carboxylic acid, propionic acid, malonic acid, adipic acid, fumaric acid, maleic acid, etc. Although the inorganic base is not particularly limited, the inorganic base is exemplified by ammonium hydroxide, alkali metal hydroxide, alkaline earth metal hydroxide, carbonate, hydrogencarbonate, sulfate, etc.; and the inorganic base is more specifically exemplified by sodium hydroxide, potassium hydroxide, potassium carbonate, sodium carbonate, sodium hydrogencarbonate, potassium hydrogencarbonate, calcium hydroxide, calcium carbonate, potassium sulfate, calcium sulfate, etc. The organic base is also not particularly limited, and is exemplified by alcoholamine, trialkylamine, tetraalkylammonium, tris(hydroxymethyl)aminomethane, etc. The alcoholamine is exemplified by ethanolamine, etc. The trialkylamine is exemplified by trimethylamine, triethylamine, tripropylamine, tributylamine, trioctylamine, etc. The tetraalkylammonium is exemplified by tetramethylammonium, tetraethylammonium, tetrapropylammonium, tetrabutylammonium, tetraoctylammonium, etc.

As the cationic polymer, it is allowable to use those other than the compounds represented by the general formula (1), the general formula (2), and the general formula (3); or it is allowable not to use those other than the compounds represented by the general formula (1), the general formula (2), and the general formula (3). It is allowable that any one of the compounds represented by the general formula (1), the general formula (2), and the general formula (3) is used singly, or two or more compounds of the compounds represented by the general formula (1), the general formula (2), and the general formula (3) are used in combination. Further, as the cationic polymer, it is allowable that polyallylamine which is the compound represented by the general formula (1), polyallylamine hydrochloride which is the compound represented by the general formula (2), or polylysine which is the compound represented by the general formula (3) is used singly; or two or more compounds of polyallylamine, polyallylamine hydrochloride, and polylysine are used in combination. In the water-based ink of the present teaching, from a viewpoint of jetting stability, it is preferable to use polyallylamine, polyallylamine hydrochloride or polylysine.

The cationic polymer other than the compounds represented by the general formula (1), the general formula (2), and the general formula (3) is exemplified, for example, by polyamine, polyethyleneimine, polyvinylamine, polyvinylpyridine, polyethyleneimine-epichlorohydrin reaction product, polyamide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-SO$_2$ copolymer, dimethyldiallylammonium chloride polymer, and derivatives thereof. Further, the cationic polymer other than the compounds represented by the general formula (1), the general formula (2), and the general formula (3) is also exemplified, for example, by a polymer of single monomer or a copolymer of a plurality of monomers composed of at least one of water-soluble monomers including, for example, dimethylaminoethyl methacrylate (DM), methacryloxyethyl trimethyl ammonium chloride (DMC), methacryloxyethyl benzyl dimethyl ammonium chloride (DMBC), dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), and acrylamide propyl trimethyl ammonium chloride (DMAPAAQ).

It is allowable to prepare the cationic polymer in-house or to use a commercially available product of the cationic polymer. The commercially available product is exemplified, for example, by "PAA (trade name)-01", "PAA (trade name)-03", "PAA (trade name)-08", and "PAA (trade name)-15" produced by Nitto Boseki Co., Ltd.

The basic amino acid is exemplified, for example, by a compound represented by the following general formula (4). Specific examples of the basic amino acid include arginine, ornithine, lysine, histidine, hydroxylysine, tryptophan, desmosine, creatine, γ-aminobutyric acid, etc., among which arginine, ornithine, lysine, histidine are preferable. From a viewpoint of improvement in optical density, arginine and lysine are more preferable.

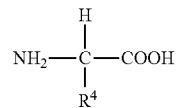

(4)

In the general formula (4), R$^4$ is basic functional group having functional group which includes nitrogen atom at the terminal thereof.

As the basic amino acid, it is allowable that any one of arginine, ornithine, lysine, and histidine is singly used; or two or more compounds are selected from the group consisting of arginine, ornithine, lysine, and histidine and are used in combination.

The basic amino acid may include a derivative of the basic amino acid. In a case that the isomer, such as the tautomer or stereoisomer (for example, geometric isomer, conformational isomer, and stereoisomer), exists in the basic amino acid and the derivative thereof, it is allowable to use any of the isomers in the present teaching. Further, a salt of the basic amino acid and a salt of the derivative of the basic amino acid may also be used in the present teaching. The salt is exemplified by an acid addition salt. The acid composing the acid addition salt may be an inorganic acid or organic acid. Although the inorganic acid is not particularly limited, the inorganic acid is exemplified by hydrochloric acid, sulfuric acid, phosphoric acid, hydrofluoric acid, hydrobromic acid, hydroiodic acid, hypofluorous acid, hypochlorous acid, hypobromous acid, hypoiodous acid, fluorine acid, chlorous acid, bromous acid, iodous acid, fluoric acid, chloric acid, bromic acid, iodic acid, perfluorinated acid, perchloric acid, perbromic acid, periodic acid, etc. Although the organic acid is also not particularly limited, the organic acid is exemplified by glutamic acid, p-toluenesulfonic acid, methanesulfonic acid, oxalic acid, p-bromobenzenesulfonic acid, carbonic acid, succinic acid, citric acid, benzoic acid, acetic acid, hydroxy carboxylic acid, propionic acid, malonic acid, adipic acid, fumaric acid, maleic acid, etc.

Further, at least one of the cationic polymer and the basic amino acid may be a compound represented by the general formula (3) in which p is 4 and q is 1 or more. A compound represented by the general formula (3) in which p is 4 and q is 1 is lysine which is the basic amino acid. A compound in which p is 4 and q is 2 or more is polylysine which is the cationic polymer. That is, both of lysine and polylysine are represented by the general formula (3) and have a common chemical structure in which p is 4. In the water-based ink of the present teaching, from a viewpoint of jetting stability, it is preferable to contain at least one of lysine and polylysine.

The cationic polymer and the basic amino acid produce cation. The pigment, which is negatively charged by the phosphate group on the recording medium to which the water-based ink is jetted, is considered to be aggregated by the cation produced from the cationic polymer or the basic amino acid. Further, it is assumed that the optical density (OD value) is improved by the aggregation of the pigment. The optical density of the water-based ink is especially improved by the cationic polymer or the basic amino acid in a case that the phosphate group-modified self-dispersible pigment is used as the colorant. The reason thereof is not clear, but it is assumed that the phosphate group-modified self-dispersible pigment is more likely to be aggregated by the cationic polymer or the basic amino acid as compared with the carboxylic group-modified self-dispersible pigment or the sulfonate group-modified self-dispersible pigment. Then, the inventors of the present teaching have succeeded in improving the re-dispersion property of the water-based ink while maintaining the high optical density (high OD value) in the water-based ink containing the phosphate group-modified self-dispersible pigment and at least one of the cationic polymer and the basic amino acid by containing at least one selected from the group consisting of the boric acids, the chelate agent, the reducing sugar, and the sugar alcohol in the water-based ink.

In a case that the water-based ink contains the boric acids or the chelate agent, the blending amount of at least one of the cationic polymer and the basic amino acid with respect to the entire amount of the water-based ink is preferably 0.001% by weight to 0.05% by weight, is more preferably 0.003% by weight to 0.04% by weight, and is further more preferably 0.005% by weight to 0.03% by weight. In the case, the blending amount of at least one of the cationic polymer and the basic amino acid with respect to the entire amount of the water-based ink may be 0.001% by weight to 0.03% by weight. Further, in a case that the water-based ink contains the reducing sugar or the sugar alcohol, the blending amount of at least one of the cationic polymer and the basic amino acid with respect to the entire amount of the water-based ink is preferably 0.001% by weight to 0.07% by weight, is more preferably 0.005% by weight to 0.05% by weight, and is further more preferably 0.01% by weight to 0.03% by weight. In the case, the blending amount of at least one of the cationic polymer and the basic amino acid with respect to the entire amount of the water-based ink may be 0.005% by weight to 0.03% by weight. By adjusting balance of the water-based ink composition so that the contents of both of at least one of the cationic polymer and the basic amino acid and at least one selected from the group consisting of the boric acids, the chelate agent, the reducing sugar, and the sugar alcohol are within the respective optimum ranges as described above, it is possible to further improve the optical value (OD value) and the re-dispersion property of the water-based ink at the same time. It is allowable that one kind of at least one of the cationic polymer and the basic amino acid is used singly; or two or more kinds of at least one of the cationic polymer and the basic amino acid are used in combination.

Further, it is preferable that at least one selected from the group consisting of the boric acids, the chelate agent, the reducing sugar, and the sugar alcohol is contained in the water-based ink in a specific weight ratio with respect to the cationic polymer or the basic amino acid. In a case that the water-based ink contains the boric acids, the weight ratio of the boric acids with respect to the cationic polymer or the basic amino acid, that is, (boric acids)/(cationic polymer or basic amino acid) is preferably 16 to 100. In a case that the water-based ink contains the chelate agent, the weight ratio of the chelate agent with respect to the cationic polymer or the basic amino acid, that is, (chelate agent)/(cationic polymer or basic amino acid) is preferably 16 to 100. In a case that the water-based ink contains the reducing sugar, the weight ratio of the reducing sugar with respect to the cationic polymer or the basic amino acid, that is, (reducing sugar)/(cationic polymer or basic amino acid) is preferably 40 to 670. In a case that the water-based ink contains the sugar alcohol, the weight ratio of the sugar alcohol with respect to the cationic polymer or the basic amino acid, that is, (sugar alcohol)/(cationic polymer or basic amino acid) is preferably 40 to 540.

The water-based ink may further contain a conventionally known additive, if necessary. The additive is exemplified, for example, by surfactant, pH-adjusting agent, viscosity-adjusting agent, surface tension-adjusting agent, and fungicide. The viscosity-adjusting agent is exemplified, for example, by polyvinyl alcohol, cellulose, and water-soluble resin.

The water-based ink can be prepared, for example, as follows. That is, the colorant, water, the water-soluble organic solvent, the boric acids, at least one of the cationic polymer and the basic amino acid, and optionally other additive component(s) as necessary are mixed uniformly or homogenously by a conventionally known method. Then, undissolved matter(s) is (are) removed by a filter or the like.

Next, an ink cartridge of the present teaching will be explained. The ink cartridge of the present teaching is an ink cartridge which includes a water-based ink for ink-jet recording, wherein the water-based ink is the water-based ink for ink-jet recording of the present teaching. It is allowable to use, for example, a conventionally known body for ink cartridge as the body of the ink cartridge of the present teaching.

Next, an explanation will be given about an ink-jet recording apparatus and an ink-jet recording method using the same, of the present teaching. The recording includes printing text (character, letter), printing image or picture, printing, etc.

The ink-jet recording apparatus of the present teaching is an ink-jet recording apparatus which includes an ink accommodating section and an ink discharge mechanism; and which jets ink accommodated in the ink accommodating section by the ink discharge mechanism, wherein the water-based ink for ink-jet recording of the present teaching is accommodated in the ink accommodating section.

FIG. 1 shows a construction of an example of the ink-jet recording apparatus of the present teaching. As shown in FIG. 1, an ink-jet recording apparatus 1 includes four ink cartridges 2, an ink discharge mechanism (ink-jet head) 3, a head unit 4, a carriage 5, a driving unit 6, a platen roller 7, and a purge device 8 as main constitutive components or parts.

The four ink cartridges 2 contain four colors of water-based inks respectively, the four colors being yellow, magenta, cyan, and black. For example, the water-based black ink is the water-based ink for ink-jet recording of the present teaching. It is allowable to use general or commercially available water-based inks as the remaining inks other than the water-based black ink. The ink-jet head 3 disposed on the head unit 4 performs recording on a recording medium (for example, recording paper sheet) P. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application Laid-open No. 2008-246821). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the recording, so as to prevent the water-based ink from drying.

In the ink-jet recording apparatus 1 of the present teaching, the four ink cartridges 2 are provided, together with the head unit 4, on one carriage 5. However, the present teaching is not limited to this. In the ink-jet recording apparatus, each of the four ink cartridges 2 may be provided on a carriage which is different (separate) from the carriage on which the head unit 4 is provided. Alternatively, each of the four ink cartridges 2 may be arranged and fixed inside the ink-jet recording apparatus, rather than being provided on the carriage 5. In such aspects, for example, each of the four ink cartridges 2 and the head unit 4 which is provided on the carriage 5 are connected with a tube, etc., and the water-based ink is supplied from each of the four ink cartridges 2 to the head unit 4 via the tube.

Ink jet recording using the ink-jet recording apparatus 1 is performed, for example, in the following manner. Namely, at first, the recording paper sheet P is supplied or fed from a paper feeding cassette or sheet feeding cassette (not shown) arranged at a side of or at a position below the ink-jet recording apparatus 1. The recording paper sheet P is introduced or guided between the ink-jet head 3 and the platen roller 7. Then, a predetermined recording is performed on the fed or introduced recording paper sheet P with the water-based ink discharged or jetted from the ink-jet head 3. The water-based ink of the present teaching can be discharged stably from the ink-jet head 3 because of the excellent re-dispersion property. Further, it is possible to obtain a recorded matter having the high optical density (OD value) by using the water-based ink of the present teaching. The recording paper sheet P for which the recording has been performed is discharged from the ink-jet recording apparatus 1. In FIG. 1, a paper feeding mechanism and a paper discharge mechanism for the recording paper sheet P are omitted.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

According to the present teaching, there is provided an ink-jet recording method for performing recording by discharging the water-based ink from the ink discharge mechanism, wherein the water-based ink for ink-jet recording of the present teaching is used as the water-based ink. The ink-jet recording method of the present teaching can be practiced, for example, by using the ink-jet recording apparatus of the present teaching.

EXAMPLES

Next, examples of the present teaching will be explained together with comparative examples. Note that the present teaching is not limited and is not restricted to the examples and the comparative examples which will be described below.

Examples 1-9 and Comparative Examples 1-6

As shown in TABLE 4, each of the water-based inks of Examples 1-9 contains the phosphate group-modified self-dispersible carbon black, the boric acids, and at least one of the cationic polymer and the basic amino acid. Components except for the self-dispersible carbon black, which were included in Composition of Water-based Ink (TABLE 4) as indicated below, were mixed uniformly or homogeneously; and thus an ink solvent was obtained. Subsequently, the ink solvent was added to the self-dispersible carbon black dispersed in water, followed by being mixed uniformly. After that, the obtained mixture was filtrated through a cellulose acetate membrane filter (pore size 3.00 μm) produced by Toyo Roshi Kaisha, Ltd., and thus water-based inks for ink-jet recording in Examples 1-9 and Comparative Examples 1-6 were obtained. The phosphate group-modified self-dispersible carbon black can be obtained, for example, by the general manufacturing method as described above.

The water-based inks of Examples 1-9 and Comparative Examples 1-6 were subjected to (a) re-dispersion property evaluation and (b) optical density (OD value) evaluation with the following method.

(a) Re-dispersion Property Evaluation

The water-based inks of Examples 1-9 and Comparative Examples 1-6 were dripped each in an amount of 12 μL onto glass slides, respectively. Subsequently, the glass slides were stored for duration of one day under an environment of temperature: 100° C., and thus the water-based inks were evaporated and dried. Several drops (3 drops) of water were dripped by a dripping pipette onto each of solid matters obtained after the water-based inks were evaporated and dried. The evaluation samples prepared in such a manner were observed with the naked eye (unaided eye) and by using a ×50-magnification optical microscope. The re-dispersion property was visually evaluated in accordance with the following evaluation criterion.

<Evaluation Criterion for Re-dispersion Property>

Figure 2A:
FIGS. 2A to 2C are diagrams showing evaluation criteria of re-dispersion property in examples of the present teaching.

A: As shown in FIG. 2A, the solid matter was completely dissolved and dispersed in the water when being observed both with the naked eye and the optical microscope.

B+: When being observed with the naked eye, the solid matter was completely dissolved and dispersed in the water; but when being observed with the optical microscope, a part of the solid matter remained without being dissolved and dispersed in the water.

Figure 2B:
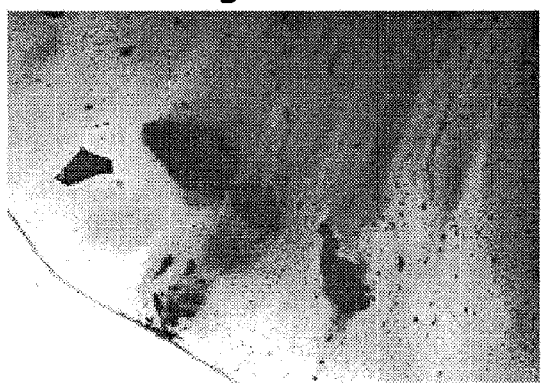

B: Although the solid matter was gradually dissolved and dispersed in the water, a part of the solid matter remained without being dissolved and dispersed in the water when being observed with the naked eye. When being observed with the optical microscope, the solid matter was in a state as shown in FIG. 2B.

B−: The solid matter was dissolved and dispersed to an extent that the color of the water was slightly changed to the color of the solid matter; but a part of the solid matter remained as a clod.

Figure 2C:

C: As shown in FIG. 2C, the solid matter was not dissolved and dispersed in the water at all and remained as the clod when being observed both with the naked eye and the optical microscope.

(b) Optical Density (OD Value) Evaluation

A digital multifunction machine DCP-385C provided with an ink-jet printer produced by Brother Industries, Ltd. was used to record an image including a single-color black patch with the water-based inks of Examples and Comparative Examples, at a resolution of 600 dpi×600 dpi, on a regular paper sheet, and evaluation samples were prepared. The optical density (OD value) of each of the evaluation samples was measured by using a spectrophotometric colorimetry meter SpectroEye (light source: $D_{50}$; density: ANSI T; reference white: Abs; built-in (internal) filter: NO) produced by X-Rite. Three types of regular paper sheets were used as the regular paper sheet. "Hammermill Laser Print (trade name)" produced by International Paper Company was used as a regular paper sheet 1. "Business" produced by XEROX CORPORATION was used as a regular paper sheet 2. "Recycled Supreme" produced by XEROX CORPORATION was used as a regular paper sheet 3. The measurement of the optical density (OD value) was performed such that the measurement was performed five times for one regular paper sheet.

The compositions and evaluation results of the water-based inks of Examples 1-9 and Comparative Examples 1-6 are shown in TABLE 4. Noted that in TABLE 4, "an average of the three types of regular paper sheets" described in the last line (column) for each of the Examples and Comparative Examples is an average value of the measurement results of the three types of regular paper sheets obtained as follows. That is, the respective average values (five measurements) of the three types of regular paper sheets were summed up; the summed value was divided by three.

TABLE 4

|  | EXAMPLES | | | | | | | |
|---|---|---|---|---|---|---|---|---|
|  | EX. 1 | EX. 2 | EX. 3 | EX. 4 | EX. 5 | EX. 6 | EX. 7 | EX. 8 |
| Water-based ink composition (wt %) | | | | | | | | |
| Phosphate group-modified self-dispersible carbon black (*1) | 4.0 | 4.0 | 4.0 | 4.0 | 4.0 | 4.0 | 4.0 | 4.0 |
| Potassium tetraborate tetrahydrate | 1.00 | 0.10 | 1.00 | 0.10 | — | — | — | — |
| Ammonium tetraborate tetrahydrate | — | — | — | — | 0.50 | 0.10 | 0.50 | 0.50 |
| Polyallylamine (*2) | 0.015 | 0.001 | — | — | — | — | — | — |
| Polylysine (*3) | — | — | 0.015 | 0.001 | — | — | — | — |
| Arginine | — | — | — | — | 0.015 | 0.001 | — | 0.030 |
| Lysine | — | — | — | — | — | — | 0.015 | — |
| Glycerol (85%) | — | — | — | — | — | — | — | — |
| Trimethylolpropane | — | — | — | — | — | — | — | — |
| Diethylene glycol | 10.00 | 10.00 | 10.00 | 10.00 | 10.00 | 10.00 | 10.00 | 10.00 |
| 2-pyrrolidone | 5.00 | 5.00 | 5.00 | 5.00 | 5.00 | 5.00 | 5.00 | 5.00 |
| Acetylenol (trade name) E40 (*4) | 0.15 | 0.15 | 0.15 | 0.15 | 0.15 | 0.15 | 0.15 | 0.15 |
| Acetylenol (trade name) E100 (*5) | — | — | — | — | — | — | — | — |
| Water | balance | balance | balance | balance | balance | balance | balance | balance |
| Blending amount of cationic polymer/basic amino acid (wt %) | 0.015 | 0.001 | 0.015 | 0.001 | 0.015 | 0.001 | 0.015 | 0.030 |
| Evaluation | | | | | | | | |
| Re-dispersion property | A | B | A | B | B+ | B | B+ | B+ |
| Optical density (OD value) Average of three type paper sheets | 1.43 | 1.40 | 1.43 | 1.39 | 1.40 | 1.38 | 1.40 | 1.41 |

|  | EXAMPLES | COMPARATIVE EXAMPLES | | | | | |
|---|---|---|---|---|---|---|---|
|  | EX. 9 | COM. 1 | COM. 2 | COM. 3 | COM. 4 | COM. 5 | COM. 6 |
| Water-based ink composition (wt %) | | | | | | | |
| Phosphate group-modified self-dispersible carbon black (*1) | 4.0 | 4.0 | 4.0 | 4.0 | 4.0 | 4.0 | 4.0 |
| Potassium tetraborate tetrahydrate | — | — | — | — | — | — | — |
| Ammonium tetraborate tetrahydrate | 0.50 | — | — | — | — | 0.20 | 0.10 |
| Polyallylamine (*2) | — | 0.015 | — | — | — | — | — |
| Polylysine (*3) | — | — | 0.015 | — | — | — | — |
| Arginine | 0.005 | — | — | 0.015 | — | — | — |
| Lysine | — | — | — | — | 0.015 | — | — |
| Glycerol (85%) | — | — | — | — | — | 11.76 | 11.76 |
| Trimethylolpropane | — | — | — | — | — | 5.00 | 5.00 |
| Diethylene glycol | 10.00 | 10.00 | 10.00 | 10.00 | 10.00 | — | — |
| 2-pyrrolidone | 5.00 | 5.00 | 5.00 | 5.00 | 5.00 | — | — |
| Acetylenol (trade name) E40 (*4) | 0.15 | 0.15 | 0.15 | 0.15 | 0.15 | — | — |
| Acetylenol (trade name) E100 (*5) | — | — | — | — | — | 0.30 | 0.30 |
| Water | balance | balance | balance | balance | balance | balance | balance |
| Blending amount of cationic polymer/basic amino acid (wt %) | 0.005 | 0.015 | 0.015 | 0.015 | 0.015 | — | — |
| Evaluation | | | | | | | |
| Re-dispersion property | A | C | C | C | C | B+ | B+ |
| Optical density (OD value) Average of three type paper sheets | 1.40 | 1.42 | 1.42 | 1.39 | 1.39 | 1.34 | 1.30 |

(*1) Prepared by the method described in PCT International Publication No. WO2007/053564
(*2) Non-neutralized product of polyallylamine (weight-average molecular weight: 3,000; produced by Nitto Boseki Co., Ltd.; active ingredient amount = 20% by weight (parenthesized numerals indicate active ingredient amounts)
(*3) Polylysine (weight-average molecular weight: 4000)
(*4) POE (4) acetylene glycol, produced by Kawaken Fine Chemicals Co., Ltd.
(*5) POE (10) acetylene glycol, produced by Kawaken Fine Chemicals Co., Ltd.

As shown in TABLE 4, in each of the water-based inks of Examples 1-9, the re-dispersion property was superior and the average optical density (OD value) of the three types of regular paper sheets was high (not less than 1.35). In each of the water-based inks of the Examples 1, 3, 5, and 7-9 in which the blending amount of at least one of the cationic polymer and the basic amino acid with respect to the entire amount of the water-based ink was 0.005% by weight to 0.03% by weight, the re-dispersion property of the water-based ink was especially excellent.

On the other hand, the re-dispersion property was inferior in each of the water-based inks of Comparative Examples 1-4 in which the boric acids were not used.

Further, the average optical density (OD value) of the three types of regular paper sheets was low (less than 1.35) in each of the water-based inks of Comparative Examples 5 and 6 in which neither the cationic polymer nor the basic amino acid was used.

Examples 10-18 and Comparative Examples 7 and 8

As shown in TABLE 5, each of the water-based inks of Examples 10-18 contains the phosphate group-modified self-dispersible carbon black, the chelate agent, and at least one of the cationic polymer and the basic amino acid. The water-based inks for ink-jet recording in Examples 10-18 and Comparative Examples 7 and 8 were obtained in the same method as the Examples 1-9 as described above based on Composition of Water-based Ink (TABLE 5) as indicated below. Then, the water-based inks of Examples 10-18 and Comparative Examples 7 and 8 were subjected to (a) re-dispersion property evaluation and (b) optical density (OD value) evaluation with the same method as the Examples 1-9 as described above. The compositions and evaluation results of the water-based inks of Examples 10-18 and Comparative Examples 7 and 8 are shown in TABLE 5. For the purpose of reference, compositions and evaluation results of the water-based inks of Comparative Examples 1-4 are also shown in TABLE 5.

TABLE 5

| | EXAMPLES | | | | | | | |
|---|---|---|---|---|---|---|---|---|
| | EX. 10 | EX. 11 | EX. 12 | EX. 13 | EX. 14 | EX. 15 | EX. 16 | EX. 17 |
| Water-based ink composition (wt %) | | | | | | | | |
| Phosphate group-modified self-dispersible carbon black (*1) | 4.0 | 4.0 | 4.0 | 4.0 | 4.0 | 4.0 | 4.0 | 4.0 |
| Nitrilotriacetic acid trisodium salt monohydrate | 1.00 | 0.10 | 1.00 | 0.10 | — | — | — | — |
| Disodium ethylenediamine tetraacetate | — | — | — | — | 0.50 | 0.10 | 0.50 | 0.50 |
| Polyallylamine (*2) | 0.015 | 0.001 | — | — | — | — | — | 0.030 |
| Polylysine (*3) | — | — | 0.015 | 0.001 | — | — | — | — |
| Arginine | — | — | — | — | 0.015 | 0.001 | — | — |
| Lysine | — | — | — | — | — | — | 0.015 | — |
| Glycerol (85%) | — | — | — | — | — | — | — | — |
| Trimethylolpropane | — | — | — | — | — | — | — | — |
| Diethylene glycol | 10.00 | 10.00 | 10.00 | 10.00 | 10.00 | 10.00 | 10.00 | 10.00 |
| 2-pyrrolidone | 5.00 | 5.00 | 5.00 | 5.00 | 5.00 | 5.00 | 5.00 | 5.00 |
| Acetylenol (trade name) E40 (*4) | 0.15 | 0.15 | 0.15 | 0.15 | 0.15 | 0.15 | 0.15 | 0.15 |
| Acetylenol (trade name) E100 (*5) | — | — | — | — | — | — | — | — |
| Water | balance | balance | balance | balance | balance | balance | balance | balance |
| Blending amount of cationic polymer/basic amino acid (wt %) | 0.015 | 0.001 | 0.015 | 0.001 | 0.015 | 0.001 | 0.015 | 0.030 |
| Evaluation | | | | | | | | |
| Re-dispersion property | A | B | A | B | B+ | B | B+ | B+ |
| Optical density (OD value) Average of three type paper sheets | 1.43 | 1.38 | 1.43 | 1.37 | 1.40 | 1.36 | 1.40 | 1.44 |

| | EXAMPLES | COMPARATIVE EXAMPLES | | | | | |
|---|---|---|---|---|---|---|---|
| | EX. 18 | COM. 1 | COM. 2 | COM. 3 | COM. 4 | COM. 7 | COM. 8 |
| Water-based ink composition (wt %) | | | | | | | |
| Phosphate group-modified self-dispersible carbon black (*1) | 4.0 | 4.0 | 4.0 | 4.0 | 4.0 | 4.0 | 4.0 |
| Nitrilotriacetic acid trisodium salt monohydrate | — | — | — | — | — | — | — |
| Disodium ethylenediamine tetraacetate | 0.50 | — | — | — | — | 0.20 | 0.10 |
| Polyallylamine (*2) | 0.005 | 0.015 | — | — | — | — | — |
| Polylysine (*3) | — | — | 0.015 | — | — | — | — |
| Arginine | — | — | — | 0.015 | — | — | — |
| Lysine | — | — | — | — | 0.015 | — | — |
| Glycerol (85%) | — | — | — | — | — | 11.76 | 11.76 |
| Trimethylolpropane | — | — | — | — | — | 5.00 | 5.00 |
| Diethylene glycol | 10.00 | 10.00 | 10.00 | 10.00 | 10.00 | — | — |
| 2-pyrrolidone | 5.00 | 5.00 | 5.00 | 5.00 | 5.00 | — | — |
| Acetylenol (trade name) E40 (*4) | 0.15 | 0.15 | 0.15 | 0.15 | 0.15 | — | — |
| Acetylenol (trade name) E100 (*5) | — | — | — | — | — | 0.30 | 0.30 |
| Water | balance | balance | balance | balance | balance | balance | balance |
| Blending amount of cationic polymer/basic amino acid (wt %) | 0.005 | 0.015 | 0.015 | 0.015 | 0.015 | — | — |

TABLE 5-continued

| Evaluation | | | | | | | |
|---|---|---|---|---|---|---|---|
| Re-dispersion property | A | C | C | C | C | A | A |
| Optical density (OD value) Average of three type paper sheets | 1.40 | 1.42 | 1.42 | 1.39 | 1.39 | 1.32 | 1.31 |

(*1) Prepared by the method described in PCT International Publication No. WO2007/053564
(*2) Non-neutralized product of polyallylamine (weight-average molecular weight: 3,000; produced by Nitto Boseki Co., Ltd.; active ingredient amount = 20% by weight (parenthesized numerals indicate active ingredient amounts)
(*3) Polylysine (weight-average molecular weight: 4000)
(*4) POE (4) acethylene glycol, produced by Kawaken Fine Chemicals Co., Ltd.
(*5) POE (10) acethylene glycol, produced by Kawaken Fine Chemicals Co., Ltd.

As shown in TABLE 5, in each of the water-based inks of Examples 10-18, the re-dispersion property was superior and the average optical density (OD value) of the three types of regular paper sheets was high (not less than 1.35). In each of the water-based inks of the Examples 10, 12, 14, and 16-18 in which the blending amount of at least one of the cationic polymer and the basic amino acid with respect to the entire amount of the water-based ink was 0.005% by weight to 0.03% by weight, the re-dispersion property of the water-based ink was especially excellent.

On the other hand, the re-dispersion property was inferior in each of the water-based inks of Comparative Examples 1-4 in which the chelate agent was not used.

Further, the average optical density (OD value) of the three types of regular paper sheets was low (less than 1.35) in the each of the water-based inks of Comparative Examples 7 and 8 in which neither the cationic polymer nor the basic amino acid was used.

Examples 19-27 and Comparative Examples 9 and 10

As shown in TABLE 6, each of the water-based inks of Examples 19-27 contains the phosphate group-modified self-dispersible carbon black, the reducing sugar, and at least one of the cationic polymer and the basic amino acid. The water-based inks for ink-jet recording in Examples 19-27 and Comparative Examples 9 and 10 were obtained in the same method as the Examples 1-9 as described above based on Composition of Water-based Ink (TABLE 6) as indicated below. Then, the water-based inks of Examples 19-27 and Comparative Examples 9 and 10 were subjected to (a) re-dispersion property evaluation and (b) optical density (OD value) evaluation with the same method as the Examples 1-9 as described above. The compositions and evaluation results of the water-based inks of Examples 19-27 and Comparative Examples 9 and 10 are shown in TABLE 6. For the purpose of reference, compositions and evaluation results of the water-based inks of Comparative Examples 1-4 are also shown in TABLE 6.

TABLE 6

| | EXAMPLES | | | | | | | |
|---|---|---|---|---|---|---|---|---|
| | EX. 19 | EX. 20 | EX. 21 | EX. 22 | EX. 23 | EX. 24 | EX. 25 | EX. 26 |
| Water-based ink composition (wt %) | | | | | | | | |
| Phosphate group-modified self-dispersible carbon black (*1) | 4.0 | 4.0 | 4.0 | 4.0 | 4.0 | 4.0 | 4.0 | 4.0 |
| D(+)-xylose | 10.00 | 0.20 | 10.00 | 0.20 | — | — | 10.00 | — |
| D(+)-glucose | — | — | — | — | 5.00 | 0.20 | — | 5.00 |
| Polyallylamine (*2) | 0.015 | 0.005 | — | — | — | — | — | — |
| Polylysine (*3) | — | — | 0.015 | 0.005 | — | — | — | — |
| Arginine | — | — | — | — | 0.015 | 0.005 | — | 0.030 |
| Lysine | — | — | — | — | — | — | 0.015 | — |
| Glycerol (85%) | — | — | — | — | — | — | — | 11.76 |
| Trimethylolpropane | — | — | — | — | — | — | — | 5.00 |
| Diethylene glycol | 10.00 | 10.00 | 10.00 | 10.00 | 10.00 | 10.00 | 10.00 | — |
| 2-pyrrolidone | 5.00 | 5.00 | 5.00 | 5.00 | 5.00 | 5.00 | 5.00 | — |
| Acetylenol (trade name) E40 (*4) | 0.15 | 0.15 | 0.15 | 0.15 | 0.15 | 0.15 | 0.15 | — |
| Acetylenol (trade name) E100 (*5) | — | — | — | — | — | — | — | 0.30 |
| Water | balance | balance | balance | balance | balance | balance | balance | balance |
| Blending amount of cationic polymer/basic amino acid (wt %) | 0.015 | 0.005 | 0.015 | 0.005 | 0.015 | 0.005 | 0.015 | 0.030 |
| Evaluation | | | | | | | | |
| Re-dispersion property | A | B | A | B | B+ | B | A | B+ |
| Optical density (OD value) Average of three type paper sheets | 1.43 | 1.36 | 1.43 | 1.36 | 1.40 | 1.35 | 1.40 | 1.42 |

| | EXAMPLES | COMPARATIVE EXAMPLES | | | | | |
|---|---|---|---|---|---|---|---|
| | EX. 27 | COM. 1 | COM. 2 | COM. 3 | COM. 4 | COM. 9 | COM. 10 |
| Water-based ink composition (wt %) | | | | | | | |
| Phosphate group-modified self-dispersible carbon black (*1) | 4.0 | 4.0 | 4.0 | 4.0 | 4.0 | 4.0 | 4.0 |
| D(+)-xylose | — | — | — | — | — | — | — |
| D(+)-glucose | 5.00 | — | — | — | — | 5.00 | 0.20 |
| Polyallylamine (*2) | — | 0.015 | — | — | — | — | — |

TABLE 6-continued

|  | | | | | | | |
|---|---|---|---|---|---|---|---|
| Polylysine (*3) | — | — | 0.015 | — | — | — | — |
| Arginine | 0.010 | — | — | 0.015 | — | — | — |
| Lysine | — | — | — | — | 0.015 | — | — |
| Glycerol (85%) | 11.76 | — | — | — | — | 11.76 | 11.76 |
| Trimethylolpropane | 5.00 | — | — | — | — | 5.00 | 5.00 |
| Diethylene glycol | — | 10.00 | 10.00 | 10.00 | 10.00 | — | — |
| 2-pyrrolidone | — | 5.00 | 5.00 | 5.00 | 5.00 | — | — |
| Acetylenol (trade name) E40 (*4) | — | 0.15 | 0.15 | 0.15 | 0.15 | — | — |
| Acetylenol (trade name) E100 (*5) | 0.30 | — | — | — | — | 0.30 | 0.30 |
| Water | balance | balance | balance | balance | balance | balance | balance |
| Blending amount of cationic polymer/basic amino acid (wt %) | 0.010 | 0.015 | 0.015 | 0.015 | 0.015 | — | — |
| Evaluation | | | | | | | |
| Re-dispersion property | A | C | C | C | C | A | B |
| Optical density (OD value) Average of three type paper sheets | 1.40 | 1.42 | 1.42 | 1.39 | 1.39 | 1.22 | 1.26 |

(*1) Prepared by the method described in PCT International Publication No. WO2007/053564
(*2) Non-neutralized product of polyallylamine (weight-average molecular weight: 3,000; produced by Nitto Boseki Co., Ltd.; active ingredient amount = 20% by weight (parenthesized numerals indicate active ingredient amounts)
(*3) Polylysine (weight-average molecular weight: 4000)
(*4) POE (4) acethylene glycol, produced by Kawaken Fine Chemicals Co., Ltd.
(*5) POE (10) acethylene glycol, produced by Kawaken Fine Chemicals Co., Ltd.

As shown in TABLE 6, in each of the water-based inks of Examples 19-27, the re-dispersion property was superior and the average optical density (OD value) of the three types of regular paper sheets was high (not less than 1.35). In each of the water-based inks of the Examples 19, 21, 23, and 25-27 in which the blending amount of at least one of the cationic polymer and the basic amino acid with respect to the entire amount of the water-based ink was 0.01% by weight to 0.03% by weight, the re-dispersion property of the water-based ink was especially excellent.

On the other hand, the re-dispersion property was inferior in each of the water-based inks of Comparative Examples 1-4 in which the reducing sugar was not used.

Further, the average optical density (OD value) of the three types of regular paper sheets was low (less than 1.35) in each of the water-based inks of Comparative Examples 9 and 10 in which neither the cationic polymer nor the basic amino acid was used.

Examples 28-36 and Comparative Examples 11 and 12

As shown in TABLE 7, each of the water-based inks of Examples 28-36 contains the phosphate group-modified self-dispersible carbon black, the sugar alcohol, and at least one of the cationic polymer and the basic amino acid. The water-based inks for ink-jet recording in Examples 28-36 and Comparative Examples 11 and 12 were obtained in the same method as the Examples 1-9 as described above based on Composition of Water-based Ink (TABLE 7) as indicated below. Then, the water-based inks of Examples 28-36 and Comparative Examples 11 and 12 were subjected to (a) re-dispersion property evaluation and (b) optical density (OD value) evaluation with the same method as the Examples 1-9 as described above. The compositions and evaluation results of the water-based inks of Examples 28-36 and Comparative Examples 11 and 12 are shown in TABLE 7. For the purpose of reference, compositions and evaluation results of the water-based inks of Comparative Examples 1-4 are also shown in TABLE 7.

TABLE 7

| | EXAMPLES | | | | | | | |
|---|---|---|---|---|---|---|---|---|
| | EX. 28 | EX. 29 | EX. 30 | EX. 31 | EX. 32 | EX. 33 | EX. 34 | EX. 35 |
| Water-based ink composition (wt %) | | | | | | | | |
| Phosphate group-modified self-dispersible carbon black (*1) | 4.0 | 4.0 | 4.0 | 4.0 | 4.0 | 4.0 | 4.0 | 4.0 |
| D-mannitol | 8.00 | 0.20 | 8.00 | 0.20 | — | — | — | — |
| D-sorbitol | — | — | — | — | 5.00 | 0.20 | 5.00 | 5.00 |
| Polyallylamine (*2) | 0.015 | 0.005 | — | — | — | — | — | — |
| Polylysine (*3) | — | — | 0.015 | 0.005 | — | — | — | — |
| Arginine | — | — | — | — | 0.015 | 0.005 | — | 0.030 |
| Lysine | — | — | — | — | — | — | 0.015 | — |
| Glycerol (85%) | — | — | — | — | — | — | — | — |
| Trimethylolpropane | — | — | — | — | — | — | — | — |
| Diethylene glycol | 10.00 | 10.00 | 10.00 | 10.00 | 10.00 | 10.00 | 10.00 | 10.00 |
| 2-pyrrolidone | 5.00 | 5.00 | 5.00 | 5.00 | 5.00 | 5.00 | 5.00 | 5.00 |
| Acetylenol (trade name) E40 (*4) | 0.15 | 0.15 | 0.15 | 0.15 | 0.15 | 0.15 | 0.15 | 0.15 |
| Acetylenol (trade name) E100 (*5) | — | — | — | — | — | — | — | — |
| Water | balance | balance | balance | balance | balance | balance | balance | balance |
| Blending amount of cationic polymer/basic amino acid (wt %) | 0.015 | 0.005 | 0.015 | 0.005 | 0.015 | 0.005 | 0.015 | 0.030 |
| Evaluation | | | | | | | | |
| Re-dispersion property | A | B | A | B | B+ | B | B+ | B+ |
| Optical density (OD value) Average of three type paper sheets | 1.42 | 1.36 | 1.42 | 1.35 | 1.41 | 1.35 | 1.41 | 1.42 |

TABLE 7-continued

|  | EXAMPLES | COMPARATIVE EXAMPLES | | | | | |
|---|---|---|---|---|---|---|---|
|  | EX. 36 | COM. 1 | COM. 2 | COM. 3 | COM. 4 | COM. 11 | COM. 12 |
| Water-based ink composition (wt %) | | | | | | | |
| Phosphate group-modified self-dispersible carbon black (*1) | 4.0 | 4.0 | 4.0 | 4.0 | 4.0 | 4.0 | 4.0 |
| D-mannitol | — | — | — | — | — | — | — |
| D-sorbitol | 5.00 | — | — | — | — | 5.00 | 0.20 |
| Polyallylamine (*2) | — | 0.015 | — | — | — | — | — |
| Polylysine (*3) | — | — | 0.015 | — | — | — | — |
| Arginine | 0.010 | — | — | 0.015 | — | — | — |
| Lysine | — | — | — | — | 0.015 | — | — |
| Glycerol (85%) | — | — | — | — | — | 11.76 | 11.76 |
| Trimethylolpropane | — | — | — | — | — | 5.00 | 5.00 |
| Diethylene glycol | 10.00 | 10.00 | 10.00 | 10.00 | 10.00 | — | — |
| 2-pyrrolidone | 5.00 | 5.00 | 5.00 | 5.00 | 5.00 | — | — |
| Acetylenol (trade name) E40 (*4) | 0.15 | 0.15 | 0.15 | 0.15 | 0.15 | — | — |
| Acetylenol (trade name) E100 (*5) | — | — | — | — | — | 0.30 | 0.30 |
| Water | balance | balance | balance | balance | balance | balance | balance |
| Blending amount of cationic polymer/basic amino acid (wt %) | 0.010 | 0.015 | 0.015 | 0.015 | 0.015 | — | — |
| Evaluation | | | | | | | |
| Re-dispersion property | B+ | C | C | C | C | A | B |
| Optical density (OD value) Average of three type paper sheets | 1.40 | 1.42 | 1.42 | 1.39 | 1.39 | 1.22 | 1.26 |

(*1) Prepared by the method described in PCT International Publication No. WO2007/053564
(*2) Non-neutralized product of polyallylamine (weight-average molecular weight: 3,000; produced by Nitto Boseki Co., Ltd.; active ingredient amount = 20% by weight (parenthesized numerals indicate active ingredient amounts)
(*3) Polylysine (weight-average molecular weight: 4000)
(*4) POE (4) acethylene glycol, produced by Kawaken Fine Chemicals Co., Ltd.
(*5) POE (10) acethylene glycol, produced by Kawaken Fine Chemicals Co., Ltd.

As shown in TABLE 7, in each of the water-based inks of Examples 28-36, the re-dispersion property was superior and the average optical density (OD value) of the three types of regular paper sheets was high (not less than 1.35). In each of the water-based inks of the Examples 28, 30, 32, and 34-36 in which the blending amount of at least one of the cationic polymer and the basic amino acid with respect to the entire amount of the water-based ink was 0.01% by weight to 0.03% by weight, the re-dispersion property of the water-based ink was especially excellent.

On the other hand, the re-dispersion property was inferior in each of the water-based inks of Comparative Examples 1-4 in which the sugar alcohol was not used.

Further, the average optical density (OD value) of the three types of regular paper sheets was low (less than 1.35) in each of the water-based inks of Comparative Examples 11 and 12 in which neither the cationic polymer nor the basic amino acid was used.

As described above, the water-based ink of the present teaching has the excellent re-dispersion property and the high optical density (OD value). The usage of the water-based ink of the present teaching is not specifically limited, and the water-based ink of the present teaching is widely applicable to a variety of kinds of ink-jet recording.

What is claimed is:

1. A water-based ink for ink-jet recording comprising:
a self-dispersible pigment modified by phosphate group;
water;
a water-soluble organic solvent;
an additive selected from the group consisting of boric acids, a chelate agent, a reducing sugar, a sugar alcohol, and combinations thereof; and
a cationic polymer contained in an amount ranging from 0.005% by weight to 0.03% by weight based on a total weight of the water-based ink, wherein the cationic polymer is selected from the group consisting of general formula (1), general formula (3), and combinations thereof;
wherein general formula (1) is given by:

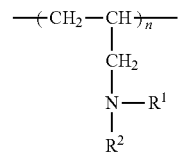

where $R^1$ and $R^2$ are independently a hydrogen atom or organic group, and n is a positive integer; and
wherein general formula (3) is given by:

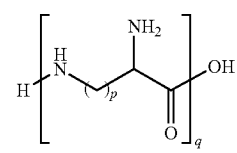

where p is an integer of 2 to 6 and q is an integer of 20 to 40.

2. The water-based ink for ink-jet recording according to claim 1, wherein the cationic polymer is of the general formula (1), and $R^1$ is a hydrogen atom and $R^2$ is a hydrogen atom.

3. The water-based ink for ink-jet recording according to claim 1, wherein the cationic polymer is of the general formula (3) and p is 4.

4. The water-based ink for ink-jet recording according to claim 1, wherein the cationic polymer is of the general formula (3) and q is an integer from 25 to 35.

5. The water-based ink for ink-jet recording according to claim 1, wherein the cationic polymer is contained in an amount ranging from 0.01% by weight to 0.03% by weight based on the total weight of the water-based ink.

6. The water-based ink for ink-jet recording according to claim 1, wherein the water-based ink does not contain a dye.

7. The water-based ink for ink-jet recording according to claim 1, wherein the cationic polymer is of general formula (1) and has a weight-average molecular weight ranging from 200 to 20000.

* * * * *